United States Patent
Rothstein et al.

(10) Patent No.: US 8,313,191 B2
(45) Date of Patent: Nov. 20, 2012

(54) EYEWEAR ASSEMBLY

(75) Inventors: Michael J. Rothstein, Bohemia, NY (US); Richard M. Baum, Roslyn, NY (US)

(73) Assignee: Miro Optix LLC, Farmingdale, NY (US)

( * ) Notice: Subject to any disclaimer, the term of this patent is extended or adjusted under 35 U.S.C. 154(b) by 96 days.

(21) Appl. No.: 12/905,635

(22) Filed: Oct. 15, 2010

(65) Prior Publication Data

US 2012/0092609 A1    Apr. 19, 2012

(51) Int. Cl.
G02C 1/08 (2006.01)
(52) U.S. Cl. ............... 351/97; 351/90; 351/95
(58) Field of Classification Search ........... 351/90, 351/95, 96, 97, 99, 100
See application file for complete search history.

(56) References Cited

U.S. PATENT DOCUMENTS

| | | | |
|---|---|---|---|
| 4,813,775 A | | 3/1989 | Kaksonen |
| 5,500,694 A | * | 3/1996 | Roever et al. .......... 351/97 |
| 5,594,511 A | | 1/1997 | Lin |
| 5,652,637 A | | 7/1997 | Marini |
| 5,668,619 A | | 9/1997 | Bolle |
| 5,726,732 A | * | 3/1998 | Kobayashi .......... 351/97 |
| 5,801,806 A | | 9/1998 | DiChiara |
| 5,847,801 A | | 12/1998 | Masunaga |
| 6,409,336 B1 | | 6/2002 | Kuo |
| 6,454,406 B1 | | 9/2002 | Guo |
| 6,712,465 B1 | | 3/2004 | Teng |
| 6,890,073 B2 | | 5/2005 | DiChiara et al. |
| 7,137,700 B2 | | 11/2006 | DiChiara et al. |
| 7,543,930 B2 | | 6/2009 | DiChiara |
| 2007/0171356 A1 | | 7/2007 | Yang |
| 2008/0304005 A1 | | 12/2008 | DiChiara |
| 2009/0051866 A1 | | 2/2009 | DiChiara |
| 2009/0257019 A1 | | 10/2009 | DiChiara |
| 2009/0296042 A1 | | 12/2009 | Yeh |

FOREIGN PATENT DOCUMENTS

JP    2006163386 A    6/2006

* cited by examiner

*Primary Examiner* — Hung Dang
(74) *Attorney, Agent, or Firm* — Hoffmann & Baron, LLP

(57) ABSTRACT

The present invention provides an eyewear assembly including a frame having a first portion and a second portion defining a first lens aperture for receiving a lens. The first portion is displaceable from the second portion to change the size of the lens aperture. The first frame portion includes a first arm extending therefrom and the second frame portion includes a second arm extending therefrom. The first and second arms include a connecting device disposed therebetween for restricting relative movement between the first and second arms. A securement body includes a slot for receiving therein the first and second arms. A locking member is engageable with the securement body and at least one of the first and second arms to secure the frame to the securement body.

24 Claims, 8 Drawing Sheets

EYEWEAR ASSEMBLY

BACKGROUND OF THE INVENTION

The present invention relates to eyewear having replaceable lenses and more particularly, eyewear having removable securement structures to permit insertion and removal of a lens from a frame.

The construction of eyewear requires that lenses be fitted into a pre-formed frame. For prescription eyewear, this is done manually by an optician for each set of eyewear as the lenses must be formed to fit the prescription of the wearer. The lenses are replaceable, so that they can be changed if damaged or if the prescription changes. Accordingly, frames are designed to allow the lenses to be removed and replaced.

One common method of removably securing a lens to a frame is to split the frame and have the resulting frame portions secured by a screw. Therefore, replacing a lens requires removing the screw to open the frame, and replacing the screw once the lens is in place. These screws can become loose over time and the threads in the frame can become stripped, resulting in the lens being displaced from the frame. Alternatively, lenses may be inserted into plastic frames by snapping the lens into the frame. Since the plastic has only a limited amount of pliability, even when heated, the groove in which the lenses are retained cannot be too deep. Therefore, excessive flexing of the frame can cause the lenses to pop out of the frame.

Conventional methods of retaining lenses in frames have various limitations and have found to be unsuitable for safety glasses. Safety glasses are eyewear which may be worn to protect the eyes and are used, for example, during sporting events or during work-related activates. Safety glasses must be able to withstand impacts without the lens separating from the frame. If such separation were to occur, the lens could be forced into the wearer's eye by the impact. Attempts to secure the lenses in safety glasses have resulted in the lens being difficult to remove and replace. This is especially problematic for prescription safety glasses where the lenses may need to be manually inserted and removed a number of times.

Accordingly, it would be desirable to provide an eyewear assembly that securely retains the lenses in the frame, yet allows for easy insertion and removal of the lenses.

SUMMARY OF THE INVENTION

The present invention provides an eyewear assembly including a frame having a first portion and a second portion defining a first lens aperture for receiving a lens. The first portion is displaceable from the second portion to change the size of the lens aperture. The first frame portion includes a first arm extending therefrom and the second frame portion includes a second arm extending therefrom. The first and second arms include a connecting device disposed therebetween for restricting relative movement between the first and second arms. A securement body includes a slot for receiving therein the first and second arms. A locking member is engageable with the securement body and at least one of the first and second arms to secure the frame to the securement body.

The present invention further provides an eyewear assembly including a frame having a first portion and a second portion defining a lens aperture for receiving a lens. The first portion is displaceable from the second portion to permit insertion and removal of a lens. The first frame portion includes a first arm extending therefrom, and the second frame portion includes a second arm extending therefrom. One of the first and second arms includes an arm aperture extending therethrough. A securement body has a slot for receiving therein the first and second arms. The securement body includes an opening in communication with the slot. The opening is aligned with the arm aperture when the first and second arms are disposed in the slot. A locking member extends through the securement body opening and the aperture thereby securing the frame to the securement body.

The present invention further provides an apparatus for removably securing a lens including a frame having a first portion and a second portion which together define a lens aperture. The first portion is displaceable from the second portion to permit the installation and removal of a lens in the lens aperture. The first frame portion includes a first arm extending therefrom and the second frame portion includes a second arm extending therefrom. Upon urging the first arm toward the second arm, the first and second arms are brought into secured engagement with each other wherein relative movement between the first and second arms is restricted. A securement body has a slot for receiving therein the first and second arms. When the first and second arms are inserted into the slot, the first arm engages the securement body to secure the frame to the securement body, and the first and second frame portions are held together to retain a lens therebetween.

The present invention still further provides, a method of removably securing a lens to a frame including:

obtaining a frame including a first portion and a second portion defining at least one lens aperture for receiving a lens, the first portion being separable from the second portion, the first frame portion including a first arm extending therefrom, the second frame portion including a second arm extending therefrom, the first and second arms including a connecting device for restricting relative movement there between;

separating the first frame portion from the second frame portion;

inserting a lens into the lens aperture;

moving the first frame portion toward the second frame portion;

bringing the first arm into engagement with the second arm to engage the connecting device, wherein movement between the first and second arm is restricted;

inserting the first and second arms into a securement body; and securing the first and second arms in the securement body.

DETAILED DESCRIPTION OF THE INVENTION

Figure 1:
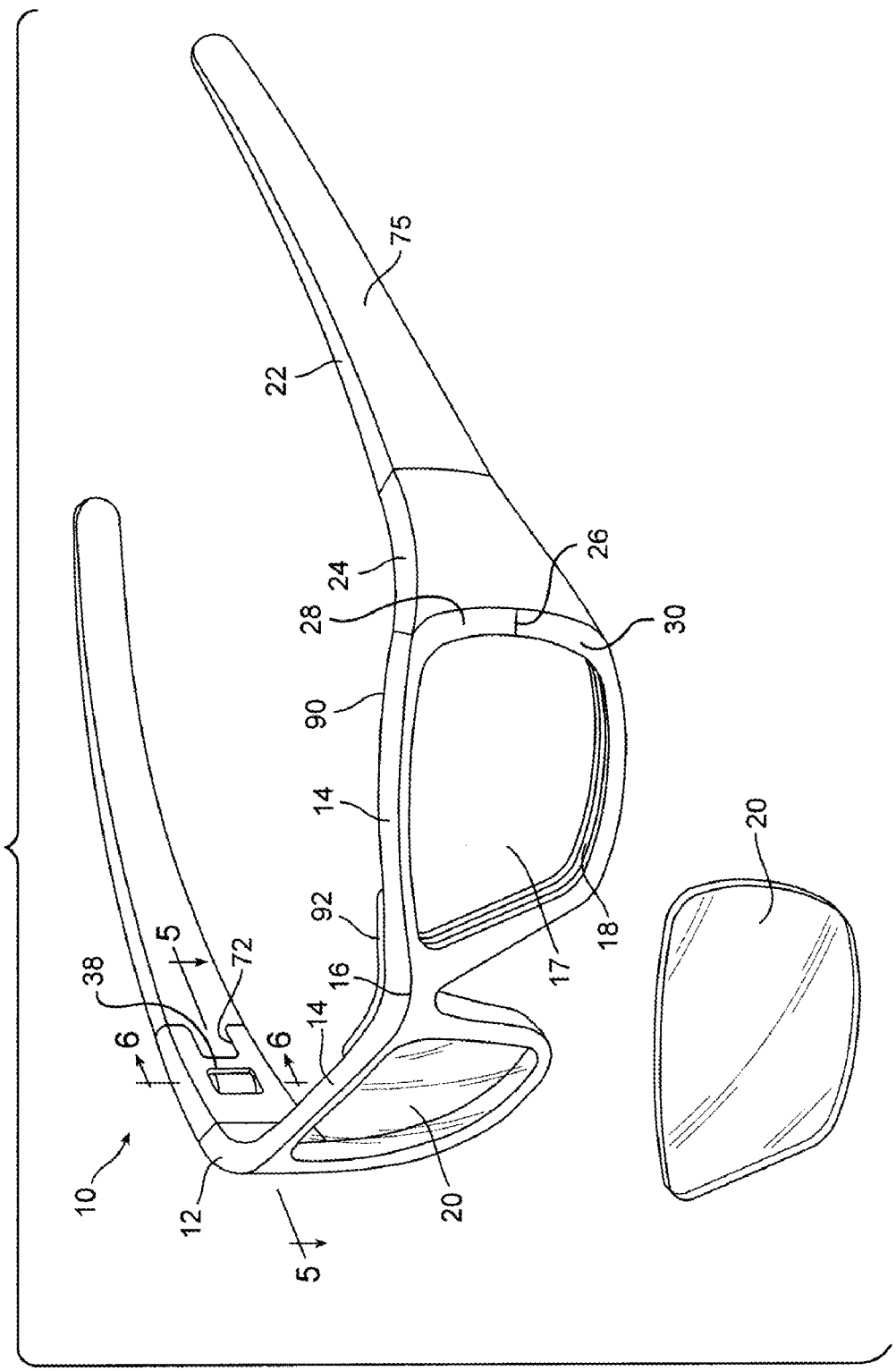
FIG. 1 is a perspective view of an eyewear assembly of the present invention.
Figure 2:
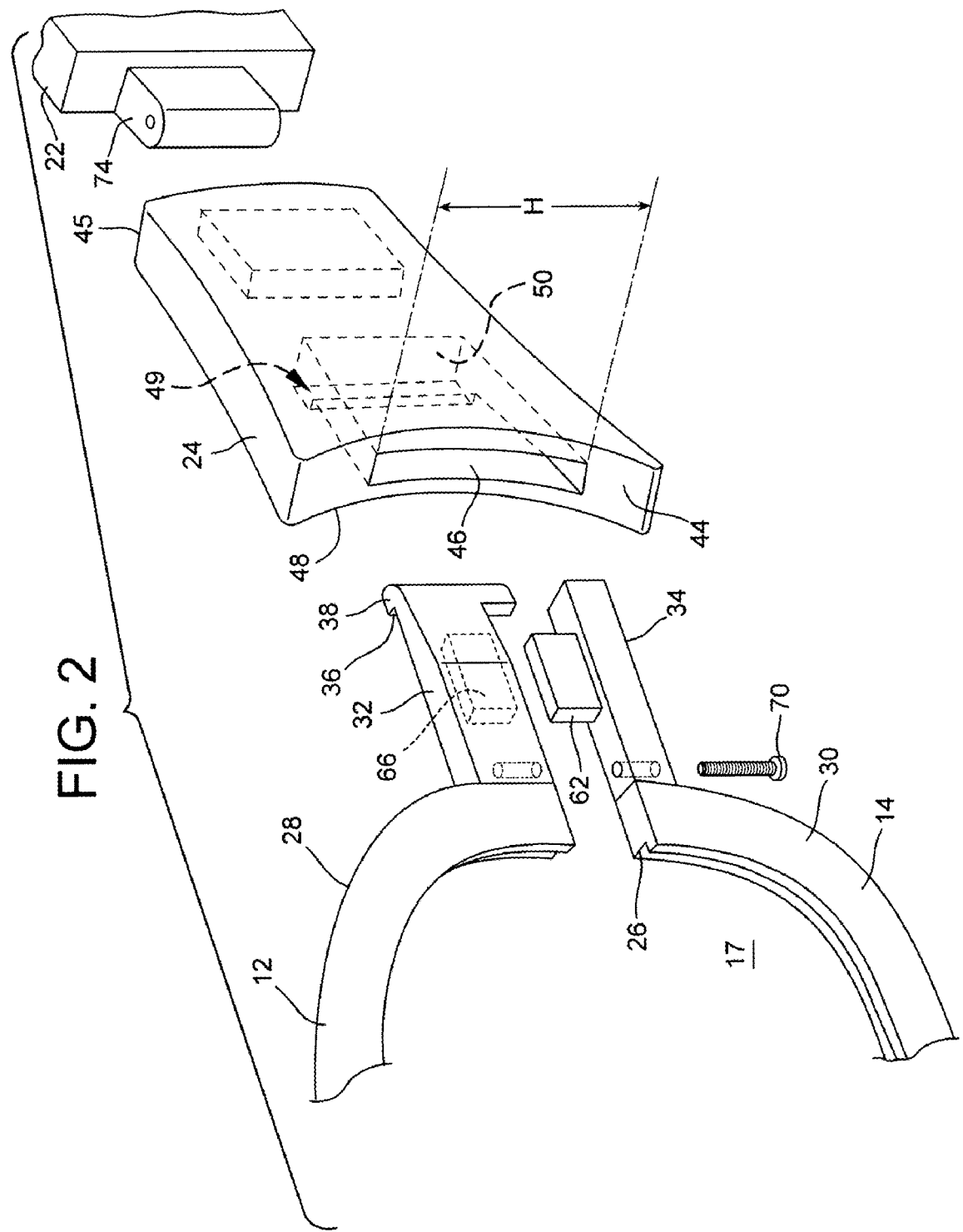
FIG. 2 is an exploded partial perspective view of the eyewear assembly of FIG. 1.

The eyewear assembly disclosed herein securely retains lenses within the frame while permitting the lenses to be expeditiously inserted and removed. With reference to FIGS. 1 and 2, the eyewear assembly 10 includes a frame 12 having a pair of lens holders 14 connected by a nose bridge 16. The lens holders 14 include lens apertures 17 formed therein. The lens apertures 17 each include a lens groove 18 extending around the perimeter of the aperture in order to accommodate therein an outer periphery of a lens 20. The eyewear assembly 10 further includes a wearer support 22 which secures the frame 12 on a wearer. The wearer support 22 is connected to the frame 12 by a pair of securement bodies 24 removably connected to each side of the frame.

Each lens holder 14 includes a first frame portion 28 and a second frame portion 30 separated by a slit 26. Due to the flexibility of the frame material, the first and second frame portions 28 and 30 may be displaced from each other to increase the size of the lens apertures 17. In this way, the lens 20 may be removed from the lens groove 18 and the aperture 17.

Figure 3:
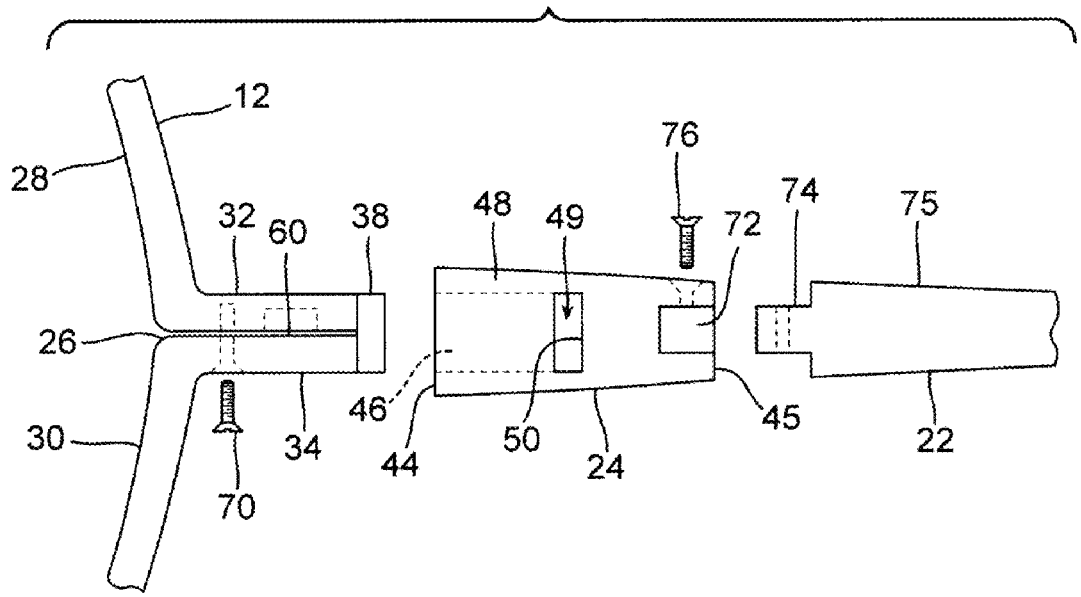
FIG. 3 is an exploded partial elevational view of the eyewear assembly of FIG. 1.
Figure 4:
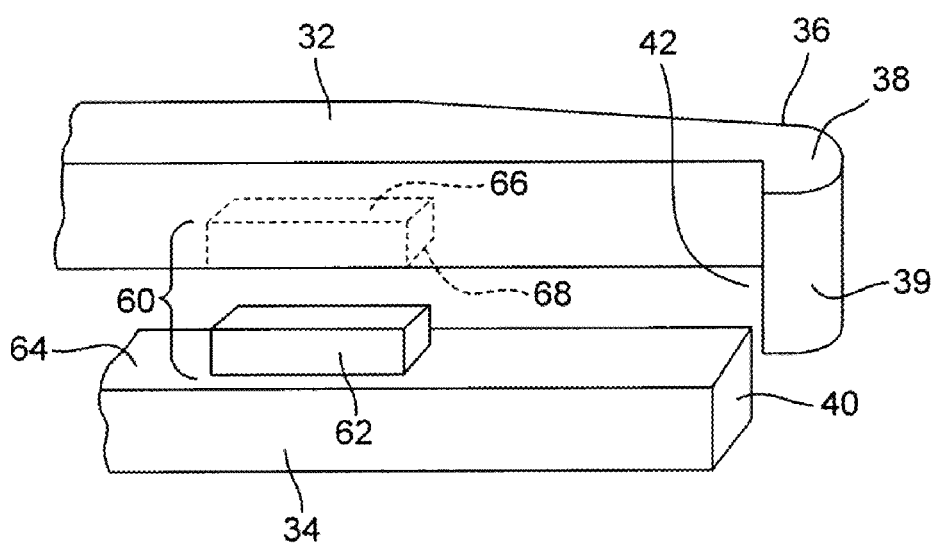
FIG. 4 is a perspective view of the first and second arms of the eyewear assembly.

After a lens is inserted within the lens groove 18, the first and second frame portions 28 and 30 are held together in order to retain the lens 20. With reference to FIGS. 3 and 4, in order to assist in retaining the frame portions together, the first frame portion 28 includes a first arm 32 projecting outwardly therefrom, and the second frame portion 30 includes a second arm 34 extending outwardly therefrom. The first and second arms 32 and 34 extend generally orthogonally from their respective frame portions in the same direction and run generally parallel to each other. The first arm 32 may include a distal end 36 having a locking member 38 extending therefrom. The locking member may include a projecting catch 39. The locking member may extend generally orthogonally from the distal end, forming a generally L-shaped member. The second arm 34 includes a distal end 40 which fits within the inside corner 42 formed by the first arm 32 and the extending locking member 38. It is within the contemplation of the present invention that the locking member 38 may instead be formed on the distal end of the second arm 34 and the first arm 32 would fit within the inside corner formed by the second arm 34 and locking member 38.

In order to insert or remove a lens from the frame lens holders 14, the first frame portion 28 and second frame portion 30 are separated from each other, thereby opening the lens holder 14 as shown in FIG. 2. Upon separating the first and second frame portions 28 and 30, the first arm 32 and second arm 34 are likewise separated from each other. After a lens 20 is inserted, the frame lens holders 14 may be closed by bring the first and second frame portions 28 and 30 back together as shown in FIG. 3. In order to maintain the first and second frame portions 28 and 30 together to retain the lens 20, the first and second arms 32 and 34 are inserted into the securement body 24.

With further reference to FIGS. 2, 4-6, the securement body 24 may include a front surface 44, a back surface 45 and an inner surface 48. The inner surface 48 faces the wearer when the eyewear assembly 10 is worn. The front surface 44 includes a slot 46 which extends into the interior of the securement body 24. The securement body inner surface includes an aperture 49 defined by a wall 50 which opens to and communicates with the slot 46. A portion of the wall forms an abutment surface 52. The slot 46 is configured to permit the first and second arms 32 and 34 to be inserted therein. The first arm 32 may be configured such that upon insertion into the slot 46, at least the end portion of the first arm deflects and is biased toward the inner surface 48 of the securement body. The first arm 32 may be formed of a resilient material such that it can be deflected upon insertion into the slot 46.

Figure 5:
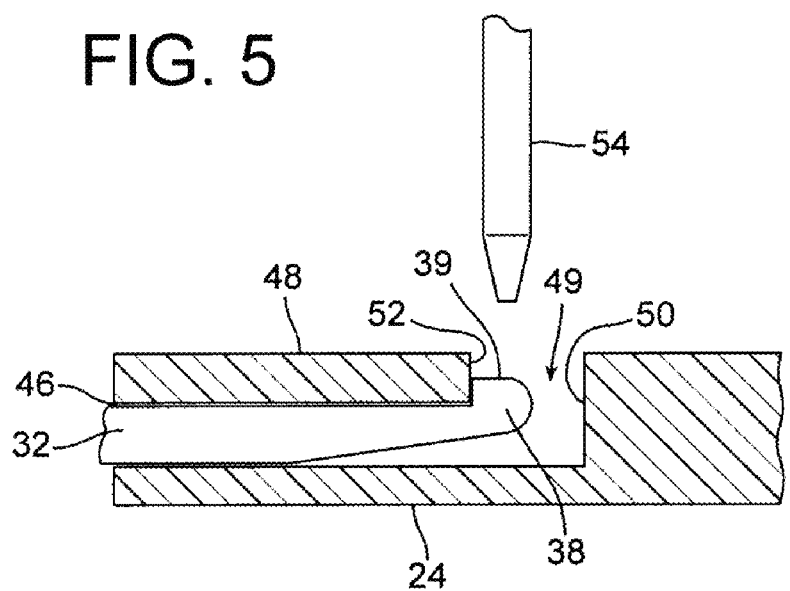
FIG. 5 is a cross-sectional view taken along line 5-5 of FIG. 1.

Upon full insertion of the first and second arms 32 and 34 into the securement body 24 as shown in FIG. 5, the locking member catch 39 on the first arm will overlie the aperture 49. The first arm 32 will then be free to spring back toward its original position such that the catch 39 enters the aperture 49 and engages the abutment surface 52. This locks the frame 12 to the securement body 24. In the locked condition, the first and second arms 32 and 34 cannot be removed from the securement body 24. In addition, the height H of the slot 46 (FIG. 2) is selected such that when the first and second arms 32 and 34 are inserted within the slot 46, the first and second arms are brought into engagement with each other along their linear extents. This causes the associated lens holder 14 to assume the closed potion wherein a lens 20 is securely retained therein. Both sides of the frame 12 may be secured to a securement body 24 in the manner described above.

In order to release the frame 12 from the securement body 24, one may access the locking catch 39 through the aperture 49 in the securement body inner surface, and deflect the locking catch 39 inwardly such that it clears the abutment surface 52. Locking catch 39 may be deflected by way of a tool 54, such as the end of a screwdriver, inserted in aperture 49. When the locking catch 39 clears the abutment surface 52, the first and second arms 32 and 34 may be removed from the securement body 24, thereby releasing the frame 12. The lens holder 14 may then be opened to remove and insert a lens 20. Since only the first arm 32 locks to the securement body 42, only one member needs to be actuated by a user to release each side of the frame. Accordingly, removal and insertion of the lenses 20 from the frame may be easily achieved.

Figure 6:
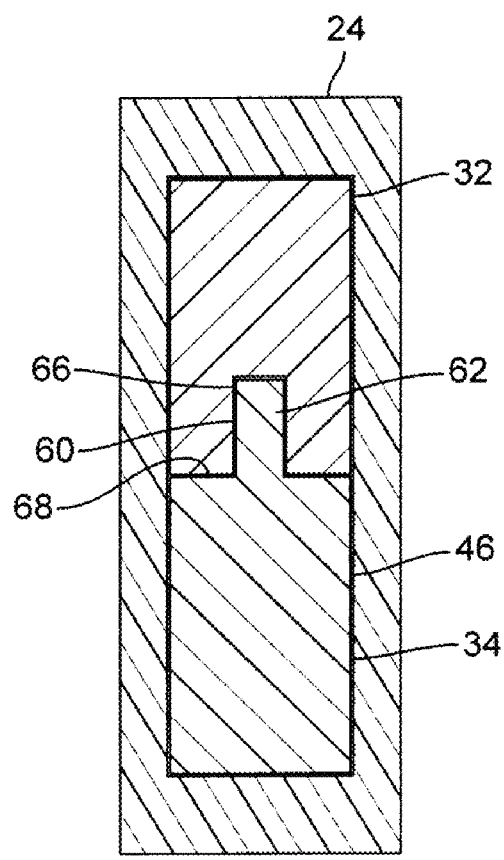
FIG. 6 is a cross-sectional view taken along line 6-6 of FIG. 1.

In addition to locking the first arm 32 to the securement body 24, insertion of the first and second arms 32 and 34 into the slot 46 operatively connects the first arm 32 to the second arm 34. With reference to FIGS. 2, 4 and 6, when the first and second arms 32 and 34 are inserted into the securement body 24, a connecting device 60 joins the first arm and second arms together. In this way, the second arm 34 is restricted from moving out of the securement body 24 when the first arm 32 is in locking engagement with the securement body 24. Since the second arm 34 does not lockingly engage the securement body 24, it is retained in the securement body 24 only through its connection to first arm 32 by the connecting device 60.

The connecting device 60 may include connecting elements located on opposed mating surfaces of the first and second arms 32 and 34. One connecting element may include a tab 62 extending from the second arm upper surface 64. The other connecting includes an indent in the form of a channel 66 formed in the first arm lower surface 68 which receives the tab 62. It is within the contemplation of the present invention that the channel 66 and tab 62 may be reversed with the tab being on the first arm and the channel being formed in the second arm. The channel 66 is sized such that when the tab 62 is inserted therein, translational movement between the first and second arm 32 and 34 is restricted. The connecting device 60 also restricts relative rotational movement between the first and second arms.

Accordingly, when the first and second arms 32 and 34 are secured within the securement body 24, the first and second frame portions 28 and 30 are restricted from moving relative to the securement body 24. This is achieved by locking the first arm 32 to the securement body 24 and locking the second arm 34 to the first arm 32. In this way the lenses 20 are securely retained within the frame 12. In addition, since the first and second arms 32 and 34 are restricted from moving relative to each other, if the frame or lenses are subject to an impact, the first frame portion 28 and second portion 30 will not move relative to each other. Therefore, the frame 12 will resist deformation such that the lenses 20 do not pop-out of the frame.

In order to further assist in retaining the first and second frame portions together, a fastener 70, shown in FIGS. 2 and 3, may extend through the first and second arms 32 and 34 adjacent first and second frame portions 28 and 30. When a lens 20 is inserted in the frame 12, the fastener 70 may be secured to close the lens holder and bring the first and second arms 32 and 34 into engagement with each other. The first and second arms 32 and 34 may then be inserted into the securement body slot 46.

In addition to securing the lenses in the frame 12, the securement bodies 24 may attach the frame 12 to the wearer support 22. In one embodiment shown in FIGS. 1 and 3, the securement member back surface 45 may include a notch 72 which receives a projecting portion 74 of the wearer support. The wearer support may be in the form of a temple arm 75 which is secured to the back end of the securement body by a temple arm fastener 76. The fastener 76 may act as a hinge point allowing the temple arm to be rotated between an open and closed position in a manner known in the art.

Figure 7:
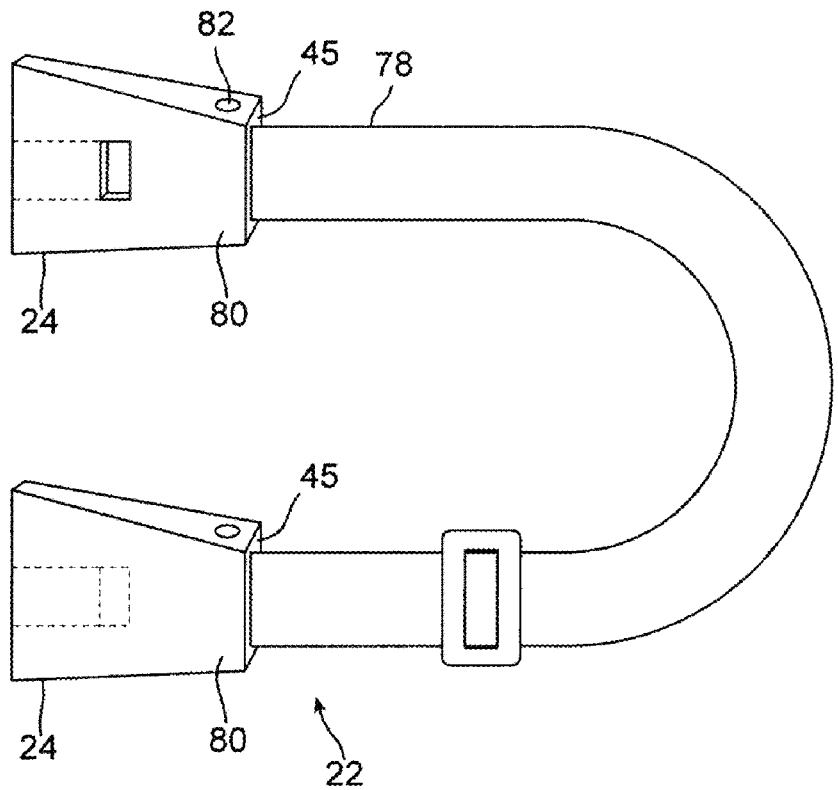
FIG. 7 is a perspective view of an alternative wear support of the present invention.

In an alternative embodiment shown in FIG. 7, the wearer support 22 may include an elastic band 78 to be fitted around the head of a wearer. The securement body back surface 45 may include an attachment point 80 to where an end of the elastic band 78 is attached. The elastic band 78 may be secured to the rear side of the securement body 24 by a pin 82 or other connecting/fastener member as is known in the art.

It is within the contemplation of the present invention that the eyewear assembly 10 may include both the temple arms 75 and the elastic band 78. Therefore, a wearer may choose the appropriate wearer support 22 depending on the activity in which they are to participate.

The wearer support 22 may be attached to its own pair of securement bodies 24. Therefore, when a wearer desires to change the wearer support 22, they would simply have to remove the current securement bodies 24 by deflecting the locking member 38 and slide the first and second arms 32 and 34 out of the slot 46 as described above. To attach the alternate wearer support, the securement bodies 24 attached to that wearer support would be slid onto the first and second arms 32 and 34 and locked into place.

By including the fastener 70 in the frame which maintains the first and second frame portions together even without the securement body 24, a user may freely interchange wearer supports 22 without concern of the lenses 20 becoming unseated or falling out of the frame 12.

It is also within the contemplation of the present invention that the frame assembly 10 may be formed without the use of the fastener wherein the lens holders 14 are held in the closed position solely by inserting the first and second arms 32 and 34 into the securement bodies 24.

The frame 12 may be formed of an elastomeric material of a type known in the art. The material may be rigid such that it will maintain its shape thereby keeping the lens therein when impacted. Therefore, the eyewear may be suitable for protecting the wearer's eyes during athletic activities or other activities which require protective eyewear.

In addition, as shown in FIG. 1, a frame inner surface 90, i.e., the surface facing the wearer, may have molded therewith a resilient material 92. The resilient material 92 provides a level of comfort to the wearer during normal wearing. In addition, if the frame 12 is impacted during an activity, the resilient material 92 will help absorb and distribute the force of the impact thereby protecting the wearer from injury.

As set forth above, the described embodiments provide an efficient way to removably secure lenses in a frame. In operation, in order to insert a lens 20 into the frame 12, a user would insert a tool 54 through the aperture 49 formed on the inner surface of the securement body 24 and push the locking member 38 away from the abutment surface 52. Once the locking member catch 39 is clear of the abutment surface 52, the first and second arms 32 and 34 may be removed from the securement body 24. This may be done for both sides of the frame 12. After the first and second arms 32 and 34 are removed from the securement body 24, the fastener 70 securing the first and second frame portions 28 and 30 together may be removed. A user may then separate the first and second frame portions thereby opening the lens holder 14 and enlarging the lens aperture 17. A lens 20 of suitable size may then be inserted between the first and second frame portions 28 and 30 such that the perimeter of the lens sits within the lens groove 18. Once the lens 20 is properly seated in the groove 18, the user may insert the fastener 70 into the first and second arms and secure the first and second frame portions together. The connecting elements 62 and 66 would then be brought into engagement. The user may then insert the first and second arms 32 and 34 into the slot 46 formed within the securement body 24. The first and second arms are inserted until the first arm locking member catch 39 engages the abutment surface 52. The lens 20 is thereby securely retained in the frame 12. This procedure may be performed for both lens holders 14 in order to remove and replace both lenses 20.

Figure 9:
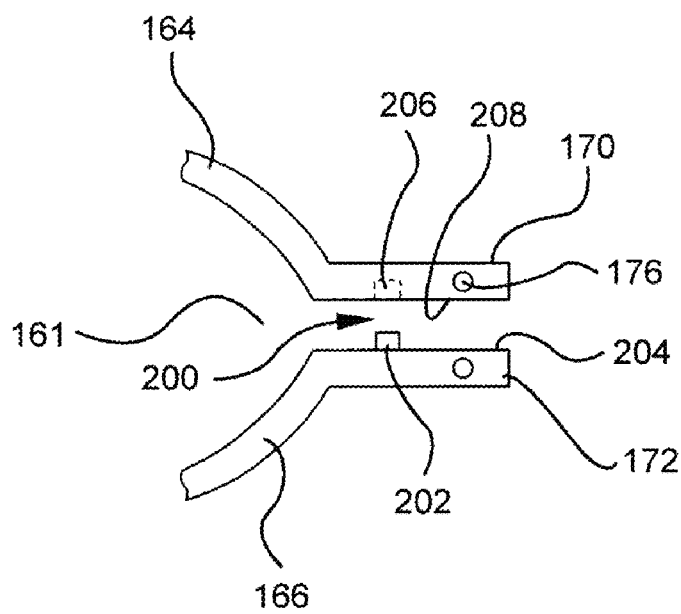
FIG. 9 is a partial elevational view of the frame of FIG. 8 showing first and second frame portions separated from one another.
Figure 8:
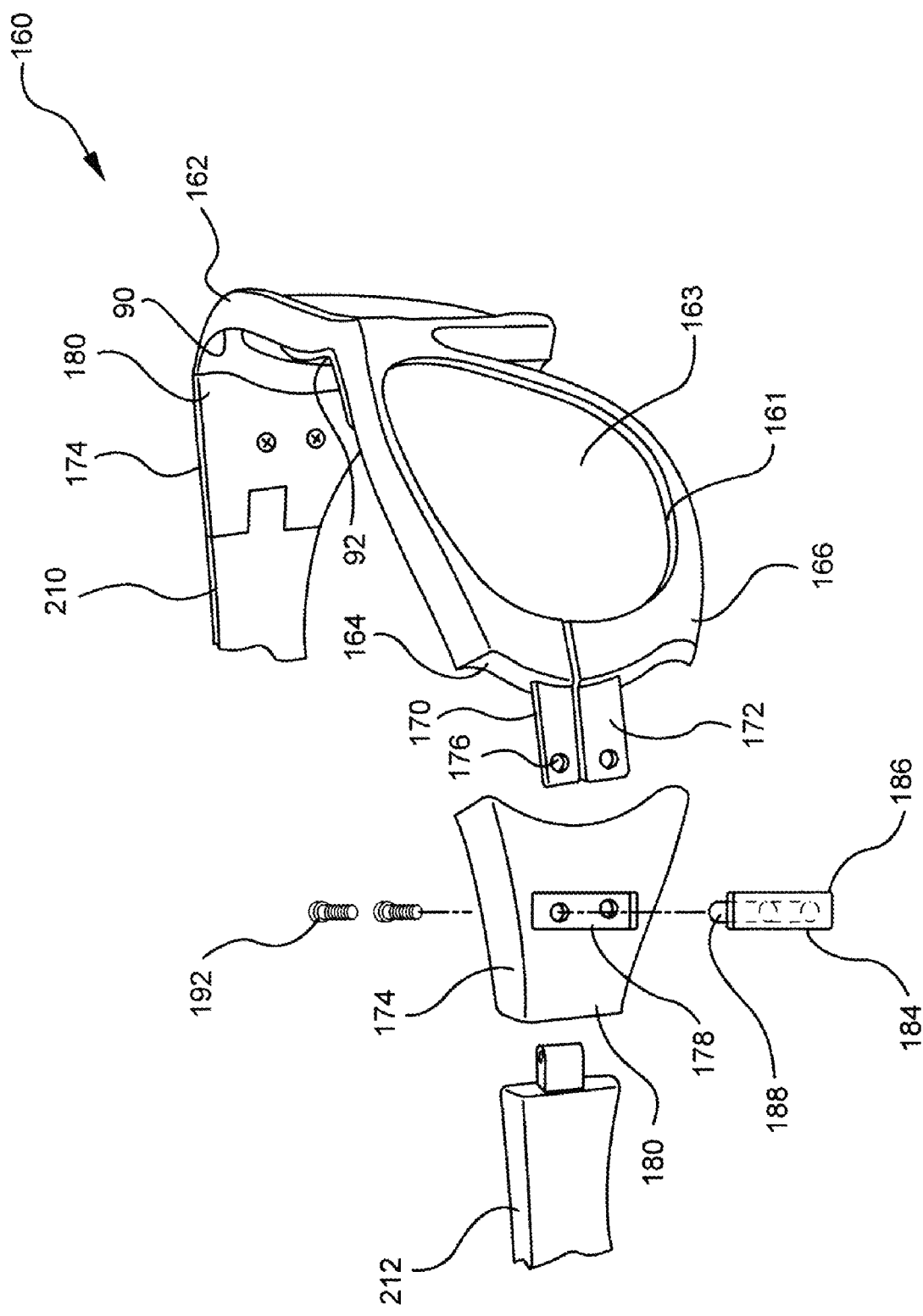
FIG. 8 is an exploded perspective view showing an alternative embodiment of a frame of the present invention.

A further alternative embodiment of the present invention is shown with reference to FIGS. 8-11. With specific reference to FIGS. 8-9, the eyewear assembly 160 is formed in a manner similar to eyewear assembly 10 described above and includes a frame 162 having a pair of lens apertures 161 for holding lenses 163. The frame 162 includes first and second frame portion 164 and 166, respectively on each side of the frame 162. The frame portions on each side of the frame 162 may be similarly formed. A lens 163 is held between the first and second frame portions 164 and 166. The first frame portion includes a first arm 170 and the second frame portion includes a second arm 172. Due to the flexibility of the frame material, the first and second frame portions 164 and 166 may be displaced from each other as shown in FIG. 9 to increase the size of the lens aperture 161 to permit the insertion and removal of the lens 163 therefrom. A securement body 174 includes a slot 175 which receives therein the first and second arms 170 and 172.

Figure 10:
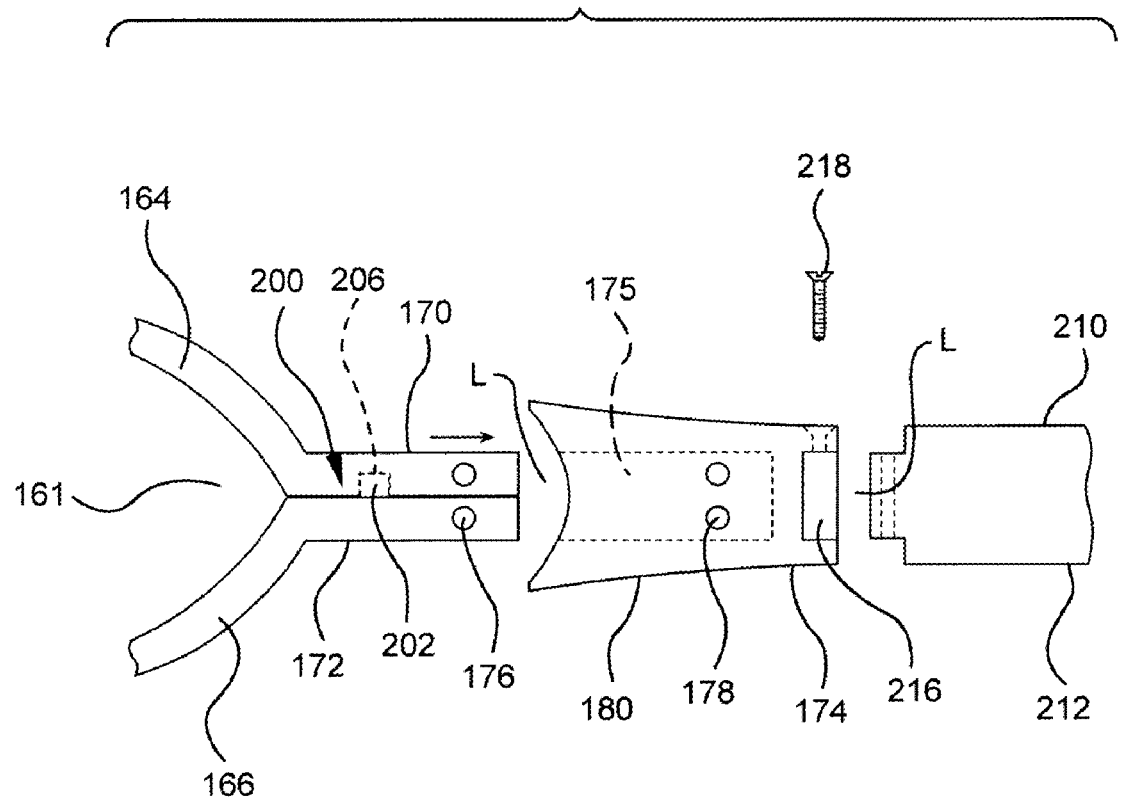
FIG. 10 is an exploded front elevational view of the alternative embodiment.
Figure 11:
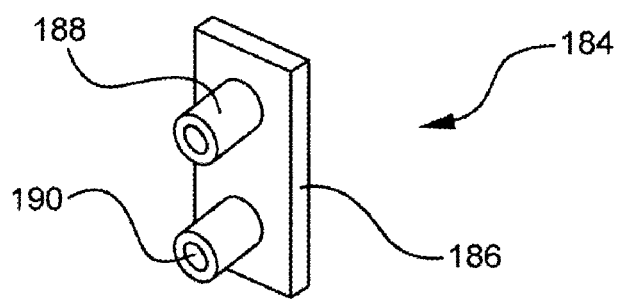
FIG. 11 is a perspective view of a locking member of the present invention.

The present embodiment differs from the embodiment described above in the manner in which the first and second arms 170 and 172 are secured and retained within the securement body 174. The first and second arms 170 and 172 do not lockingly engage the securement body and may be freely removed from the slot 175 after insertion therein. With further reference to FIG. 10 or 11, in the present embodiment, the first and second arms are retained in the securement body by way of a discrete locking member 184. The locking member 184 may be separate from the first and second arms and securement body 174. The locking member 184 may be brought into engagement with the securement body 174 and at least one of the first and second arms to retain the frame to the securement body.

The first and second arms 170 and 172 may each include an aperture 176 extending therethough. The securement body 174 includes a pair of spaced openings 178 which extend through securement body side walls 180 and communicate with the slot 175. In order to secure the frame 162 to the securement body 174, the first and second arms 170 and 172 are inserted into the securement body slot 175. The slot 175 and first and second arms 170 and 172 are configured such that a close fit occurs therebetween and holds the first arm 170 adjacent to the second arm 172 (FIG. 10) when the arms are inserted into the slot 175. When the first and second arms are brought together, the first and second frame portions are also brought together and the lens aperture 161 is sized to retain a lens therein.

When the first and second arms 170 and 172 are inserted into the slot 175, the apertures 176 in the arms align with the pair of openings 178 formed in the securement body side walls 180. The locking device 184 is then used to secure the first and second arms in the slot 175, thereby securing the frame 162 to the securement body 174. The locking member shown in FIG. 11 may include a body 186 having a first and second posts 188 projecting outwardly therefrom. The posts 188 are inserted through the securement body openings 178 and through the arm apertures 176 in a direction transverse to a securement body longitudinal axis L-L (FIG. 10). The engagement between the locking device posts 188, the arms 170 and 172, and the securement body 174 secures the first and second arms 170 and 172 to the securement body and prevents their removal therefrom. The posts 188 may each include a threaded opening 190 adapted to receive fasteners 192 so that the locking member can be secured to the securement body 174. The locking member body 186 may include indicia thereon such as a decoration or include information such as a trademark logo. With the first and second arms 170 and 172 securely retained in the securement body 174, the first and second frame portions 164 and 166 are securely held together. This in turn, securely retains the lens within the frame.

In a further alternative embodiment, not shown, the locking device may include resilient ends which expand radially outwardly after completely extending through the securement body. The locking member cannot be removed from the securement body until the resilient members are compressed inwardly.

With reference to FIGS. 9 and 10, the present embodiment may further include a connecting device 200. When the first and second arms 170 and 172 are brought together, such as when inserted into the securement body 174, the connecting device 200 connects the first and second arms together. This prevents the first and second arms 170 and 172 from moving in a direction along their lengths and adds further stability to the frame.

The connecting device 200 may be formed in a similar manner to connecting device 60 described above and include connecting elements located on opposed mating surfaces of the first and second arms. One connecting element may include a tab 202 extending from a second arm upper surface 204. The other connecting includes an indent in the form of a channel 206 formed in the first arm lower surface 208 which receives the tab 202. It is within the contemplation of the present invention that the channel 206 and tab 202 may be reversed with the tab being on the first arm and the channel being formed in the second arm. The channel 206 is sized such that when the tab 202 is inserted therein, translational movement between the first and second arms 170 and 172 is restricted. The connecting device 200 also restricts relative rotational movement between the first and second arms. Accordingly, while the cooperation of the locking device 184 and the securement body 174 retains the first and second arms in the securement body, the connecting device 200 provides further stability to the frame and prevents shifting of the frame portions even if the fasteners become loose.

Figure 12:
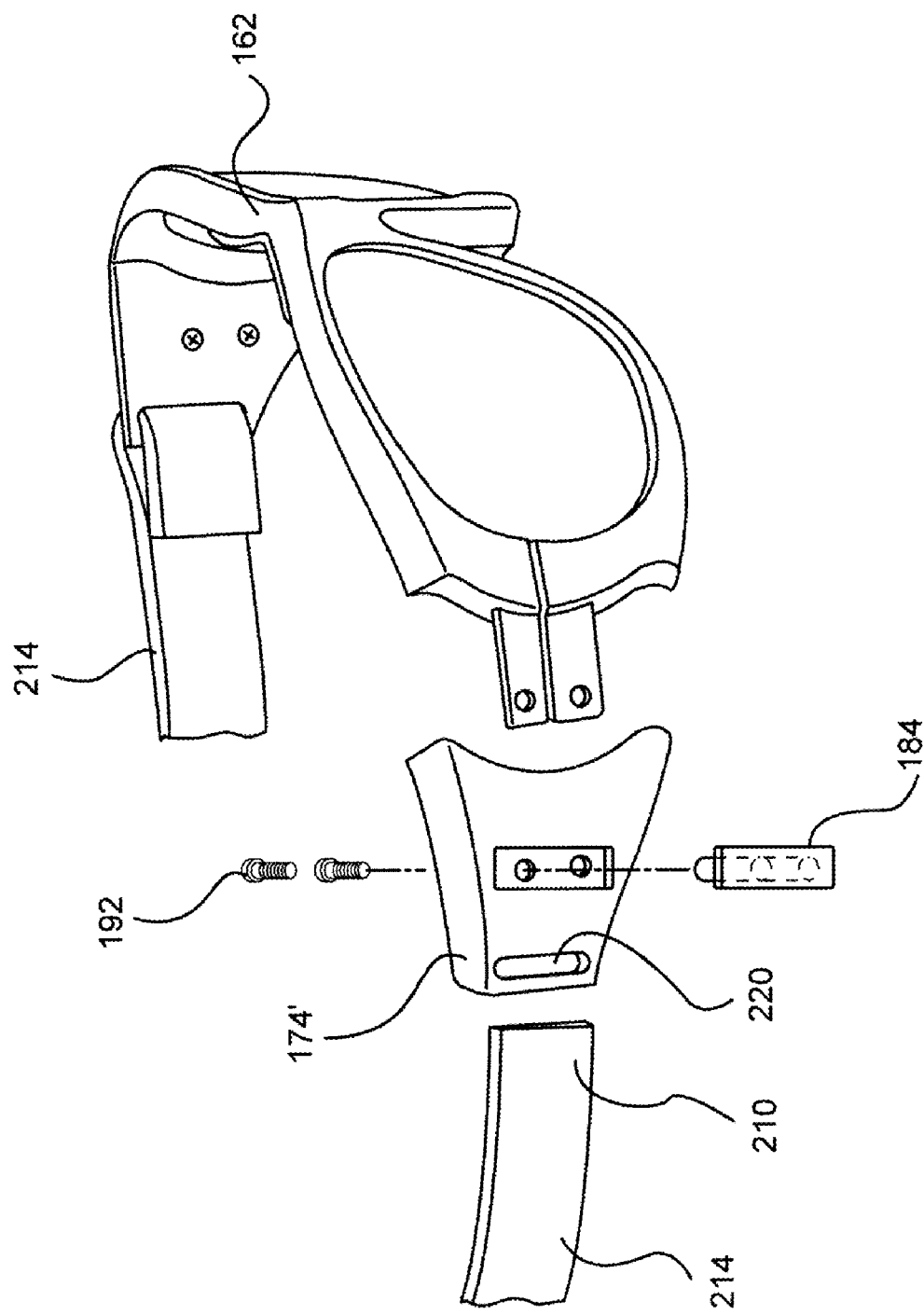
FIG. 12 is a perspective view showing a securement body attached to a wearer support strap.

As in the previously described embodiment, the securement body 174 may be secured to a wearer support 210 such as a temple arm 212 or resilient strap 214. In one embodiment shown for example in FIGS. 8 and 10, securement body 174 may include a recessed portion 216 to receive the temple arm 212 which may be pivotally secured with a fastener 218. In an alternative embodiment shown in FIG. 12, the securement body 174' may be formed with a slit 220 to receive the end of a resilient strap 214.

In order to secure a lens within the frame, a user may separate the first and second frame portion to increase the size of the lens aperture as shown in FIG. 9. A lens may then be inserted in the aperture. The first and second frame portions and arms 170 and 172 extending therefrom are then moved toward each other to retain the lens as shown in FIG. 10. The first and second arms 170 and 172 may be inserted into the securement body slot 175 such that the arm apertures 176 align with the securement body openings 178. The locking member first and second posts 188 may then be inserted into and through the apertures 176 and openings 178. Fasteners 192 may then be secured to the first and second posts 188 to secure the locking member 184 to the securement body 174. The same step would be performed for the other side of the frame to firmly secure the other lens. If a lens needs to be replaced, lens removal may be easily achieved by removing the fasteners 192 and separating the locking member 184 from the securement body 174. The first and second arms 170 and 172 may then be slid out of slot 175, and the frame portions 164 and 166 can be separated to remove the lens 163.

While the present embodiment includes apertures in both the first and second arms 170 and 172, it is within the contemplation that only one of the first and second arms includes an aperture and the locking member 184 may include only one post. One arm would be retained in the securement body by the locking member, the other arm would be held within the securement body by way of the connecting device 200.

It will be appreciated that variations of the above-disclosed and other features and functions, or alternative thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An eyewear assembly comprising:
   a frame including a first portion and a second portion defining a first lens aperture for receiving a lens, the first portion being displaceable from the second portion to change the size of the lens aperture;
   the first frame portion including a first arm extending therefrom;
   the second frame portion including a second arm extending therefrom;
   the first and second arms including a connecting device disposed therebetween for restricting relative movement between the first and second arms, the connecting device including a first connecting element formed on one of the first and second arms and a second connecting element formed on the other of the first and second arms, the first connecting element including a tab and the second connecting element including an indent for receiving the tab;
   a securement body including a slot for receiving therein the first and second arms; and
   a locking member engageable with the securement body and at least one of the first and second arms to secure the frame to the securement body.

2. The eyewear assembly as defined in claim 1, wherein the connecting device prevents translational movement between the first and second arms when the first and second arms are inserted within the securement body.

3. The eyewear assembly as defined in claim 1, further including a wearer support for supporting the frame on a wearer, the wearer support operably secured to the securement body.

4. The eyewear assembly as defined in claim 1, wherein the frame includes a second lens aperture for receiving a lens therein.

5. The eyewear assembly as defined in claim 1, wherein the second arm is not in locking engagement with the securement body.

6. The eyewear assembly as defined in claim 1, wherein the locking member includes a projecting catch disposed on a distal end of the first arm, and the securement body includes an abutment surface, the catch engaging the abutment surface to removably fasten the first arm to the securement body.

7. The eyewear assembly as defined in claim 6, wherein the securement body includes an aperture bounded by a wall and in communication with the slot and a portion of the wall forming the abutment surface.

8. The eyewear assembly as defined in claim 6, wherein the first arm is a resilient member and is deflectable to a position displaced from the abutment surface to permit removal of the first and second arms from the securement body.

9. The eyewear assembly as defined in claim 1, wherein the slot is sized such that insertion of the first and second arms into the slot prevents the first and second frame portions from separating from each other.

10. The eyewear assembly as defined in claim 1, wherein at least one of the first and second arms includes an aperture extending therethrough and the securement body includes an opening formed therein, and the locking member including a projection extending through the aperture and opening to secure the frame to the securement body.

11. The eyewear assembly as defined in claim 10, wherein the securement body includes a pair of spaced openings formed therein and the first and second arms each include an aperture extending therethrough, the locking member including a pair of spaced projections extending through the pair of apertures formed in the securement body and the apertures formed in the first and second arms to secure the frame to the securement body.

12. The eyewear assembly as defined in claim 11, wherein the locking member projections each include an opening therein adapted to receive a fastener.

13. The eyewear assembly as defined in claim 1, wherein the frame includes an elastomeric surface for engagement with a wearer.

14. The eyewear assembly as defined in claim 1, wherein the securement body retains the first and second arms together, wherein the first and second frame portions are positioned to securely retain the lens in the first lens aperture.

15. An eyewear assembly comprising:
a frame including a first portion and a second portion defining a lens aperture for receiving a lens, the first portion being displaceable from the second portion to permit insertion and removal of a lens;
the first frame portion including a first arm extending therefrom;
the second frame portion including a second arm extending therefrom, one of the first and second arms including an arm aperture extending therethrough;
a securement body including a slot for receiving therein the first and second arms, the securement body including an opening in communication with the slot, the opening being aligned with the arm aperture when the first and second arms are disposed in the slot; and
a locking member extending through the securement body opening and the aperture thereby securing the frame to the securement body.

16. The eyewear assembly as defined in claim 15, wherein the first and second arms each include an arm aperture and the securement body includes a pair of openings, the pair of openings being aligned with the arm apertures.

17. The eyewear assembly as defined in claim 16, wherein the locking member includes a pair of projections, which extend through the pair of openings and arm apertures.

18. The eyewear assembly as defined in claim 17, further including a pair of fasteners engageable with the pair of projections to secure the locking member to the securement body.

19. The eyewear assembly as defined in claim 15, wherein the first and second arms including a connecting device for restricting relative movement therebetween.

20. The eyewear assembly as defined in claim 19, wherein the connecting device includes a first connecting element formed on one of the first and second arms and a second connecting element formed on the other of the first and second arms.

21. The eyewear assembly as defined in claim 20, wherein the first connecting element includes a projecting tab and the second connecting element includes space for receiving the tab.

22. An eyewear assembly comprising:
a frame including a first portion and a second portion defining a first lens aperture for receiving a lens, the first portion being displaceable from the second portion to change the size of the lens aperture;
the first frame portion including a first arm extending therefrom;
the second frame portion including a second arm extending therefrom;
the first and second arms including a connecting device disposed therebetween for restricting relative movement between the first and second arms;
a securement body including a slot for receiving therein the first and second arms; and
a locking member engageable with the securement body and at least one of the first and second arms to secure the frame to the securement body, wherein at least one of the first and second arms includes an aperture extending therethrough and the securement body includes an opening formed therein, and the locking member including a projection extending through the aperture and opening to secure the frame to the securement body.

23. The eyewear assembly as defined in claim 22, wherein the securement body includes a pair of spaced openings formed therein and the first and second arms each include an aperture extending therethrough, the locking member including a pair of spaced projections extending through the pair of apertures formed in the securement body and the apertures formed in the first and second arms to secure the frame to the securement body.

24. The eyewear assembly as defined in claim 23, wherein the locking member projections each include an opening therein adapted to receive a fastener.

* * * * *